Dec. 25, 1934.    H. E. IVES    1,985,731
PHOTOGRAPHY IN NATURAL COLORS
Original Filed March 20, 1930    2 Sheets—Sheet 1
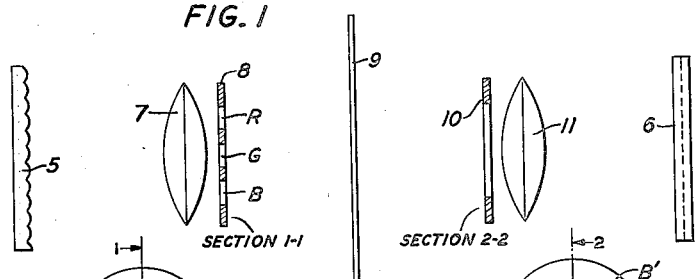
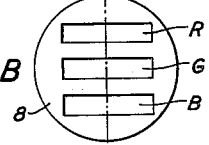
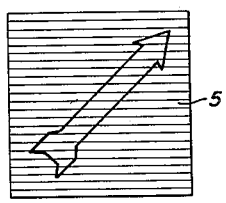
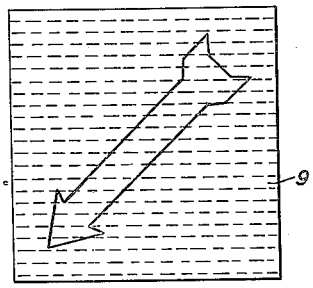
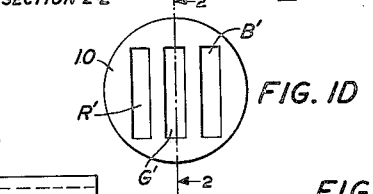
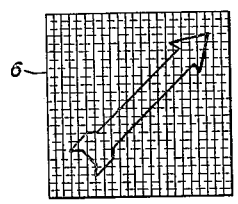
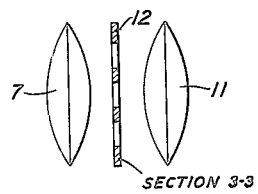
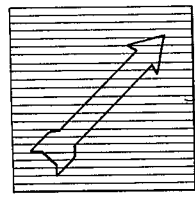
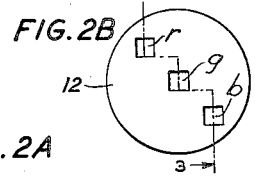
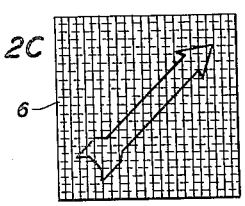
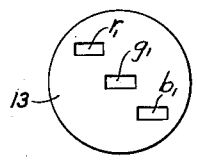
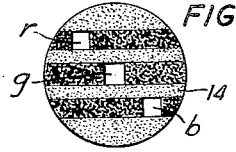
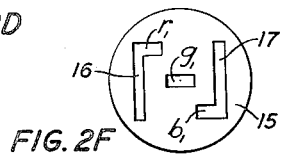
INVENTOR.
H. E. IVES
BY
C. A. Sprague
ATTORNEY Dec. 25, 1934.   H. E. IVES   1,985,731
PHOTOGRAPHY IN NATURAL COLORS
Original Filed March 20, 1930   2 Sheets-Sheet 2

INVENTOR
H. E. IVES
BY
O. A. Sprague
ATTORNEY

Patented Dec. 25, 1934

1,985,731

UNITED STATES PATENT OFFICE 1,985,731

PHOTOGRAPHY IN NATURAL COLORS

Herbert E. Ives, Montclair, N. J., assignor to Bell Telephone Laboratories, Incorporated, New York, N. Y., a corporation of New York Original application March 20, 1930, Serial No. 437,341. Divided and this application July 31, 1931, Serial No. 554,207

2 Claims. (Cl. 88—24)

This invention relates to photography and more particularly to methods of and means for producing photographic effects in colors.

In a well known form of color photography a film with ridged lenticular elements on the surface opposite to the light sensitive emulsion is used. This film is exposed in a camera, the lens of which is provided with three adjacent color filters such as are used in producing black and white color records. The ridged surface faces the lens and the photographic emulsion on the side of the film opposite the ridges is exposed to three juxtapositioned linear color record images for each lenticular ridge. The exposed film during development is reversed to form a positive which may be projected on a screen to produce an image in natural colors by means of a projection lantern the lens of which is also provided with three adjacent color filters. A limitation of this process is that only one film is produced for projection.

An object of the present invention is to facilitate the production of duplicate copies of such ridged film.

By way of illustration a limited number of embodiments of the invention will be described.

In one form of the invention a colored image is projected from the original film upon a translucent screen. This image is then rephotographed with a camera having its colored lens filters and ridged film at an angle, preferably of 90 degrees, to the filters and film of the projecting device in order to obviate moiré or patterns in the copied film. However, it is simpler to dispense with the projection of the image on the screen, and to do away with the filters entirely. Therefore in the preferred form of the invention, two cameras of suitable focal length and aperture of lenses are placed lens to lens. The film to be copied, that is the original, is placed in one camera as if for projection. The unexposed film for the copy is placed in the other camera as if for taking. The lenticular ridges of the copy film are at an angle, preferably of 90 degrees to the ridges of the original. A special apertured diaphragm is located between the lenses taking the place of the usual color filters, the apertures consisting of three rectangles arranged along a diagonal, each rectangle corresponding to what would be the overlapping portions of the same color sections of the filters were such filters retained. The resultant copy in consequence of the large angle between the directions of the ridges in the original and copying film, is free from moiré or patterns. For the copying of motion picture films the original film may have its lenticular ridges extend lengthwise of the film strip while the ridges of the copy are transverse, the films moving through the copying apparatus in opposite directions in parallel planes. To permit of the same kind of film being used for both the original and copy, for example film with lenticular ridges running lengthwise of the strip, the original and the copy may be run through the copying apparatus at right angles. When operating in this way the film during the taking process is preferably run through the taking camera in a horizontal direction. With the usual form of motion picture film, each picture frame is longer transversely to the film strip, than lengthwise thereof. In order to facilitate copying when both the original and copy have ridges running in the same direction, the long dimensions of the frames of the original are arranged lengthwise of the film strip so that the frames of the copy will be of usual form. In another form of the invention the lenticular ridges are neither lengthwise nor transverse of the film but at an angle to the edge of the film strip, preferably at 45 degrees. The same type of film is used for both the original and copy, and is run through the taking camera and the original side of the copying apparatus in the same direction, through the two sides of the copying apparatus in opposite directions, and through the copy side of the copying apparatus and the projector in the same direction. In copying, the original and the copy have the ridged surfaces of the films facing each other so that the line structure on the copy due to the ridges of the original are at right angles to the ridges of the copy, thus obviating moiré or interference patterns.

This application is a division of application Serial No. 437,341, filed March 20, 1930 and is directed to that form of the invention in which a colored image is projected upon a translucent screen and rephotographed.

The invention will now be described more in detail having reference to the accompanying drawings:

Fig. 1 illustrates a form of the invention in which from the original film a colored image is projected on a screen and rephotographed on the copy film.

Figs. 1B and 1D are face views of the colored filters of Fig. 1.

Figs. 1A and 1E are surface views of the original and copy films, respectively, of Fig. 1.

Fig. 1C is a face view of the screen of Fig. 1.

Fig. 2 illustrates another form of the invention in which the color filters and screen have been discarded.

Figs. 2A and 2C are surface views of the original and copy films, respectively, of Fig. 2.

Fig. 2B is a face view of the apertured diaphragm of Fig. 2.

Figs. 2D, 2E and 2F are forms of diaphragms of use when copying from a negative original film.

Like reference characters are used to represent identical elements in the several figures.

Figure 3:
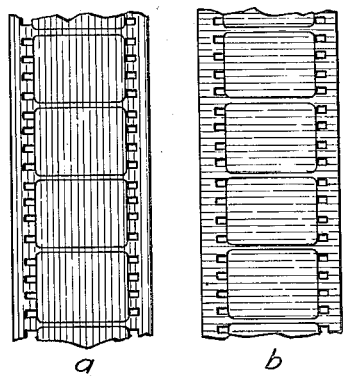
Figs. 3, 4 and 5 show various forms of original and copy motion picture films.

This invention is a practicable system for copying ridged lenticular film. It is obvious that any attempt to copy a ridged film picture by contact printing upon another ridged film is impracticable because of the difficulty of exact registration of one set of ridges on the other. If recourse is had to simple projection printing the same difficulty is encountered, while if the picture is projected in color to be rephotographed with a camera and film like those used in making the original, interference patterns or moiré will occur between the lines of the projected picture and the film unless at the cost of good definition the projected picture is deliberately blurred until the lines disappear.

This difficulty is overcome in the arrangement of Fig. 1.

An original image bearing ridged lenticular film 5 is arranged to be copied on a similar type of film 6. The image of film 5 is projected in color by means of lens 7 and color filter 8 on a translucent screen 9. This image on the screen 9 is then rephotographed through the color filter 10 by the lens 11 upon the copy film 6. The film 5 is illuminated from the left hand side either by a diffusing plate or by an extended light source and condensing system similar to that used for projection on a viewing screen of images from this type of film in well known manner. The color filter 8 comprises three sections R, G and B which correspond to the primary colors red, green and blue used in the well known three-color process. The ridged film 5 is a well known type. The image thereon consists of sets of linear color records corresponding to black and white color records of the primary colors. The function of the lenticular ridges is to direct the light rays from the linear color records through the corresponding color filter sections R, G and B to properly color the various elemental portions of the image projected on screen 9 by the lens 7. The horizontal lines in Fig. 1A represent the ridges on the face of film 5, the size of the ridges being enlarged out of proportion to the other elements of the system for the purpose of illustration. The image formed on the screen 9 has a line structure due to the ridges on the film 5. This structure is represented by the horizontal dotted lines in Fig. 1C. The color filter 10 has sections R', G' and B' which may be identical with the sections R, G and B of color filter 8 except that the long dimension is parallel to the ridges on the film 6 and, therefore, at right angles to the line structure of the image on screen 9. The surface of film 6 facing the lens 11 carries lenticular ridges such that the emulsion of film 6 is exposed to sets of color record images corresponding to the colors of the image on the screen 9. The full lines of Fig. 1E represent this ridged structure while the dotted lines of this figure represent the line structure in the image on film 6 due to the line structure of the image on screen 9 produced by the ridges on film 5. Since the ridges of film 6 are at right angles to the line structure in the image on this film no interference patterns or moiré are produced. The subject matter imaged on the films 5 and 6 and the screen 9 is represented by the arrow in Figs. 1A, 1C and 1E.

For further details regarding the type of film here employed, the producing of images thereon, and the projection of colored images therefrom, reference is made to Patent No. 992,151 of R. Berthon issued May 16, 1911.

Referring now to Fig. 2, a simplified copying system is shown in which the screen 9 of Fig. 1 has been discarded and the color filters 8 and 10 have been replaced by an apertured diaphragm 12. The original film 5 is imaged on the copy film 6 by the lenses 7 and 11 which are both focused for parallel light. The ridges of film 5 are located horizontally while those of film 6 are vertical. The diaphragm 12 has special apertures $r$, $g$ and $b$ whose function is to take the light from each set of horizontal strip images of film 5 and distribute it to the proper set of vertical ridges of film 6. There are clear apertures, each of a size which would correspond to the overlapping portions of the corresponding color sections of filters 8 and 10 of Figs. 1B and 1D, were these filters superposed. Thus, light from a red elemental color record of film 5 is directed by its lenticular ridge through the aperture $r$ to a corresponding point of film 6 where the ridge at that point directs the light to a point in the emulsion to form an image of the aperture $r$. Light from the other color records are correspondingly directed through the other apertures $g$ and $b$. Figs. 2A and 2C show the images, line structures and ridges in the same manner as Figs. 1A and 1E. If the definition is exquisite the resulting picture in film 6 shows a mesh of fine lines at right angles of equal spacing in both directions which impair the sharpness of the picture no more than the regular lines in one direction—both are supposedly invisible at the proper viewing or projecting distance.

The method of copying, employed in Fig. 2, is applicable without any complications (except an inversion of the image from left to right which may be offset by the use of a mirror in taking) if the process of photographic reversal is used on both the original and the copy. It is applicable also in principle to making positive copies from unreversed negatives. When this is done it is desirable to fill in the spaces between the image strips in order to avoid dilution by white light. This does not appear possible in the negative; in the positive it can be secured by using special diaphragms between the lenses 7 and 11. One such diaphragm is shown in Fig. 2D. The clear apertures are the same as in Fig. 2B but the diaphragm 14 is made of translucent material such as ground celluloid. This throws diffused light from all points except where the aperture is cut through. This celluloid aperture is then blackened in either horizontal direction from the clear apertures $r$, $g$ and $b$ parallel to the ridges of film 5 so that the interspaces between the line images on film 6 can be given any photographic action desired depending upon the translucency of the celluloid. Another form of aperture for blackening the interspaces is shown in Fig. 2E where the apertures $r_1$, $g_1$ and $b_1$ are of such length that their images fill the whole space between the ridges of film 6. In this arrangement the apertures are also shown as quite narrow in order to take light only from the centers of the negative strip images, which arrangement minimizes the effects of scattered light in the negative. In Fig. 2F still another type of diaphragm 15 is shown. In this form the apertures $r_1$, $g_1$ and $b_1$ are the same shape as in diaphragm 13 of Fig. 2E but additional elongated vertical slots 16 and 17 are provided to throw light from all three images into the spaces between the successive sets of three strip images. These additional slots 16 and 17 can, if desired, be illuminated from the side to insure the necessary intensity of illumination.

Figure 4:
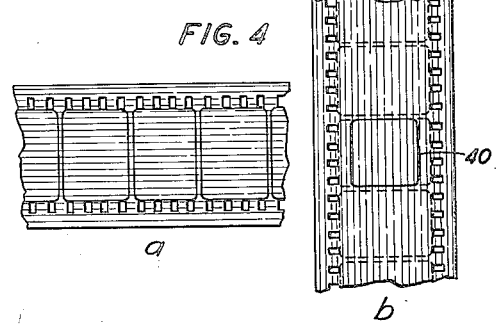
Figure 5:
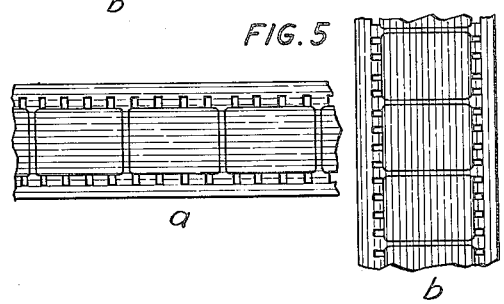

This method of projection copying is also applicable to motion picture films. Figs. 3, 4 and 5 show the invention applied to such films. In each of these figures $a$ indicates the original film to be copied, while $b$ indicates the copy film. In Fig. 3 the original film has the ridges running longitudinally while the copy has the ridges running transversely. These films are adapted for use in the optical system of Fig. 2, film $a$ taking the place of film 5 and film $b$ taking the place of film 6. Suitable mechanisms, of course, are required for moving the films in proper synchronism through the copying device for copying frame by frame.

In the arrangement of Fig. 4 the ridges on both the original $a$ and copy $b$ films run lengthwise of the film. Such an original film may be produced by turning the motion picture camera through 90 degrees on its optical axis. This type of film may also be used in the optical system of Fig. 2. Because of the rectangular shape of the frames this arrangement results in losing a portion of each frame, the final picture containing only the square which is common to the two rectangular frames when superposed in this way. Such a square frame 40 is shown by the full lines in Fig. 4$b$.

In Fig. 5 there is shown types of film which obviate this loss. The taking film $a$ is narrower and the regular frames are arranged with their long dimensions parallel to the edge of the film as shown in Fig 5$a$. When this film is copied in the optical arrangement of Fig. 2 on standard film the standard shape of frame is obtained as shown in Fig. 5$b$.

Figure 6:
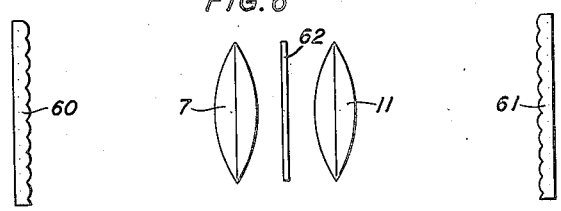
Fig. 6 illustrates another form of the invention which is similar to that of Fig. 2 but the lenticular ridges form an angle of 45 degrees with the edges of the film.
Figure 6A:
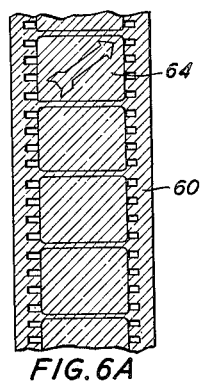
Figs. 6A and 6C are surface views of the original and copy films, respectively, of Fig. 6.
Figure 6B:
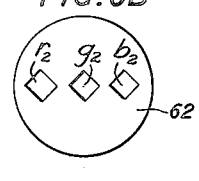
Fig. 6B is a face view of the apertured diaphragm of Fig. 6.
Figure 6D:
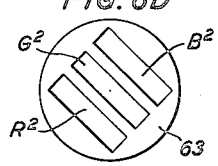
Fig. 6D is a face view of color filters for either the taking or projection with the type of film shown in Fig. 6.
Figure 6C:
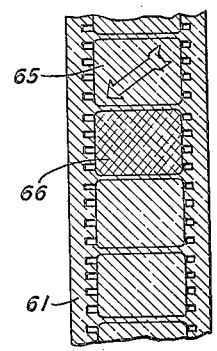

In Figs. 3 and 5 different types of films are required for the original and the copy. An arrangement is shown in Fig. 6 wherein the same type of film is used for both the original and the copy. This arrangement is substantially the same as that of Fig. 2 except for the type of film employed and the position of apertured diaphragm used between lenses 7 and 11. In this arrangement the lenticular ridges on the film form an angle of approximately 45 degrees with the edge of the film and the directional slope is the same on both the original film 60 and the copy film 61. The ridged surfaces of both films 60 and 61 face toward each other. The apertured diaphragm 62 is similar to the diaphragm 12 of Fig. 2 except that it is turned through an angle of 45 degrees. Frames 64 and 65 of Figs. 6A and 6C show the inversion of the image which takes place due to the lenses 7 and 11. It will be seen that the line structure in the copy, shown by the dotted lines in frame 66 of Fig. 6C, due to the ridged structure of the original, is unchanged in slope due to the lens inversion. As a consequence the line structure on the copy, due to the ridges of the original, is at an angle of 90 degrees with the ridges of the copy so that the picture produced from the copy is free from interference patterns or moiré. It is not necessary to adhere strictly to the 45 degree angle since diagonal ridges of a considerable range of angles will still possess the property of falling at an angle sufficient to avoid patterns when imaged and inverted in this way. No change is necessitated in the camera and projector for using this type of film, except that the colored apertures in front of the taking and projection lenses must stand at an angle as shown in Fig. 6D.

In each of these arrangements inversions take place which may be compensated by the use of mirrors as desired. Thus, a right to left inversion may be compensated by a plain vertical mirror placed at a suitable angle to the optical axes of the optical system.

Suitable housings may be provided for the elements of the various optical systems described to exclude unwanted light and to properly control the time of exposure of the copy films, such as films 6 and 61.

The term "film", as used herein, denotes not only the celluloid film of well known kind, but also is intended to cover forms of emulsion carrying material other than such celluloid film provided the ridged lenticular elemental structure is retained.

The shape and size of the color filter sections may be varied to suit the needs of any given equipment and in conformity with the emulsions, which are being used. The rectangular form of sections are shown in the drawings merely for convenience. The shape of the clear apertures is of course dependent upon the shape of the taking color filters and the type of record desired on the copy film.

It is also to be noted that various forms of lenses may be used provided only that they accomplish the primary function of lenses 7 and 11. Composite lenses for correcting for well known optical defects of simple lenses will usually be found preferable to simple lenses. Such lenses are well known to those skilled in this art.

Mechanism for moving motion picture films through the copying apparatus of this invention for projection copying frame by frame may consist of two motion picture step by step movements coupled together mechanically, as by gearing, or electrically.

The invention may be embodied in a variety of forms which come within the scope of the appended claims.

What is claimed is:

1. In a copying device for ridged lenticular film, an original ridged lenticular motion picture film and a sensitive copy ridged lenticular motion picture film, both said films having the ridges at an angle of approximately 45 degrees to the corresponding edges of the films, a translucent screen, means to project on one side of said screen from said original film a series of images in color, means to rephotograph from the opposite side of said screen said images on said copy film frame by frame to produce juxtaposed linear color records on said copy film, and means to pass the film strips through the copying device with their edges parallel.

2. A projection printer comprising a motion picture projector adapted to project colored images from a ridged lenticular original film having ridges at an acute angle to one edge of the film strip, a motion picture camera for photographing said images on ridged lenticular copy film having ridges identical with those of the original film, and means in the optical path between said films for producing a reversal of the image recorded on the copy film with respect to the picture on the original film about one only of two coordinate axes lying in the planes of the films, one of which axes is parallel to the edges of said films.

HERBERT E. IVES.